United States Patent
Lu et al.

(10) Patent No.: US 12,430,933 B2
(45) Date of Patent: Sep. 30, 2025

(54) METHOD FOR DETECTING CELLS IN IMAGES USING AUTOENCODER, COMPUTER DEVICE, AND STORAGE MEDIUM

(71) Applicant: HON HAI PRECISION INDUSTRY CO., LTD., New Taipei (TW)

(72) Inventors: Chih-Te Lu, New Taipei (TW); Tzu-Chen Lin, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 573 days.

(21) Appl. No.: 17/750,589

(22) Filed: May 23, 2022

(65) Prior Publication Data

US 2022/0375240 A1    Nov. 24, 2022

(30) Foreign Application Priority Data

May 24, 2021    (CN) .......................... 202110567131.8

(51) Int. Cl.
| | |
|---|---|
| G06V 20/69 | (2022.01) |
| G06V 10/40 | (2022.01) |
| G06V 10/774 | (2022.01) |
| G06V 10/776 | (2022.01) |
| G06V 10/98 | (2022.01) |

(52) U.S. Cl.
CPC ............ *G06V 20/695* (2022.01); *G06V 10/40* (2022.01); *G06V 10/774* (2022.01); *G06V 10/776* (2022.01); *G06V 10/98* (2022.01); *G06V 2201/03* (2022.01)

(58) Field of Classification Search
CPC ...... G06V 20/695; G06V 10/40; G06V 10/98; G06V 10/774; G06V 10/776; G06V 2201/03
See application file for complete search history.

(56) References Cited

U.S. PATENT DOCUMENTS

2021/0166785 A1\*    6/2021    Yip ..................... G06V 10/44
2022/0351005 A1\*   11/2022    Fong ................... G06V 10/143

FOREIGN PATENT DOCUMENTS

| CN | 110490840 A | 11/2019 | |
|---|---|---|---|
| CN | 110930378 A | 3/2020 | |
| CN | 111931931 A | 11/2020 | |
| CN | 112464005 A * | 3/2021 | ............ G06N 3/045 |
| CN | 112561869 A | 3/2021 | |
| CN | 112801212 A | 5/2021 | |

\* cited by examiner

*Primary Examiner* — Wednel Cadeau
(74) *Attorney, Agent, or Firm* — ScienBiziP, P.C.

(57) ABSTRACT

A method for detecting cells in images using an autoencoder, a computer device, and a storage medium extracts a first feature vector from each of a plurality of sample medical images. The first feature vector is inputted into an autoencoder, and a first latent feature of each of the plurality of sample medical images is extracted. A first predicted value of a number of cells in each of the plurality of sample medical images is generated based on the first latent feature. The first latent feature is inputted into the autoencoder, and a plurality of reconstructed images are obtained. The autoencoder is optimized based on the plurality of reconstructed images and the first predicted value. This method can be run in the computer device to improve efficiency of detection from images.

14 Claims, 3 Drawing Sheets

METHOD FOR DETECTING CELLS IN IMAGES USING AUTOENCODER, COMPUTER DEVICE, AND STORAGE MEDIUM

FIELD

The present disclosure relates to a technical field of image detection, and more particularly to a method for detecting cells in images using an autoencoder, a computer device and a storage medium.

BACKGROUND

Generally, detections in medical images can be implemented using supervised learning algorithms. However, when a data model is used to detect the medical images, complex and diverse feature information needs to be extracted. Therefore, a large number of sample images need to be used for training the data model, which results in low efficiency.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
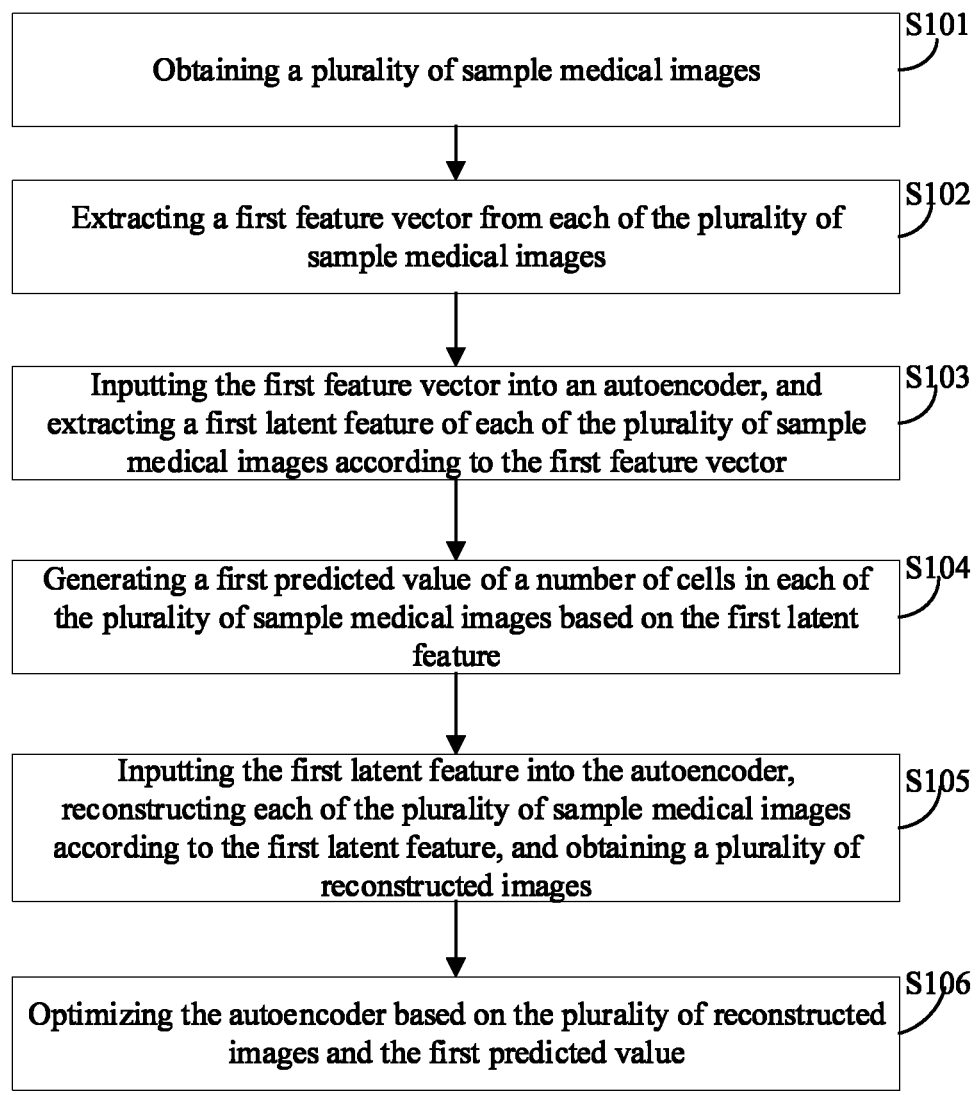
FIG. 1 is a flowchart diagram of a training method of an autoencoder adapted for detecting cells in images according to an embodiment of the present disclosure.

FIG. 1 is a flowchart diagram of a training method of an autoencoder adapted for detecting cells in images in an embodiment of the present disclosure.

Figure 4:
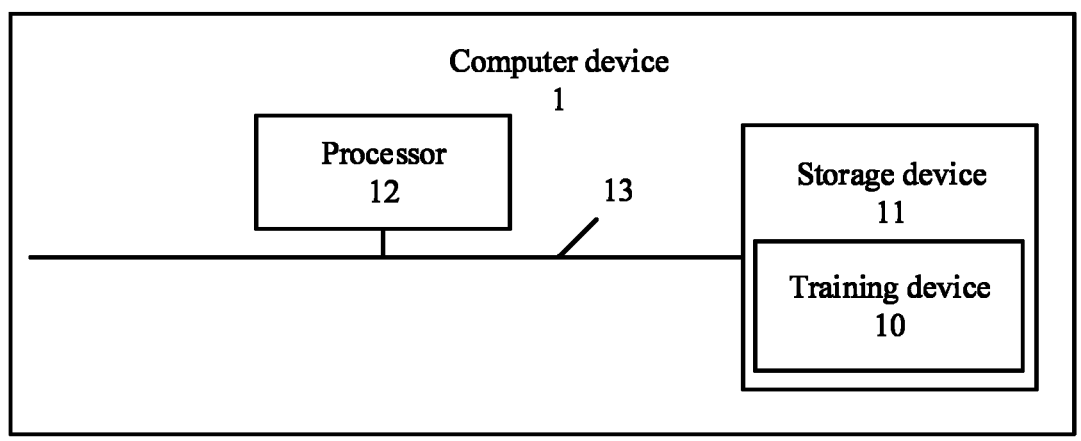
FIG. 4 is a structural diagram of a computer device housing the detecting device in an embodiment of the present disclosure.

In one embodiment, the training method of an autoencoder adapted for detecting cells in images and the method for detecting a number of cells in images can be applied to one or more computer devices, such as a computer device 1 as shown in FIG. 4, for example. The computer device includes hardware such as, a microprocessor and an Application-Specific Integrated Circuit (ASIC), a Field-Programmable Gate Array (FPGA), a Digital Signal Processor (DSP), embedded devices, for example.

The computer device may be any electronic product that can interact with a user, such as a personal computer, a tablet computer, a smart phone, a personal digital assistant (Personal Digital Assistant, PDA), a game console, and an interactive network television, an Internet Protocol Television (IPTV), or smart wearable devices, for example.

The computer device may also include a network device and/or a user device. The network device includes, but is not limited to, a single network server, a server group composed of multiple network servers, or a cloud composed of a large number of hosts or network servers based on a cloud computing technology.

A network can include, but is not limited to, the Internet, a wide area network, a metropolitan area network, a local area network, and a virtual private network (VPN), for example.

In block S101, the computer device obtains a plurality of sample medical images.

In one embodiment, the computer device trains an autoencoder by using the plurality of sample medical images, and identifies a number of cells in a medical image to be detected by using the trained autoencoder. Each sample medical image may be a high-resolution digital image, which can be obtained by scanning with a fully automatic microscope or an optical magnification system. Each sample medical image may include cells and some impurities.

In one embodiment, each sample medical image includes a marker value of a cell number. The marker value represents an exact value of a number of cells carried in each sample medical image. The autoencoder is trained and optimized using the plurality of sample medical images, and the optimized autoencoder outputs a predicted value of the number of cells. With the optimization of the autoencoder, the predicted value is more and more close to the marker value. The computer device identifies an image to be detected by using the optimized autoencoder, an accurate value of a number of cells in the image to be detected can be obtained.

In one embodiment, it is assumed that a number of the plurality of sample medical images is N.

In block S102, the computer device extracts a first feature vector from each of the plurality of sample medical images.

In one embodiment, the computer device performs a vectorization processing on each of the plurality of sample medical images, and a first feature vector of each of the plurality of sample medical images is obtained. A plurality of first feature vectors are represented as X1, X2, . . . , Xi, . . . , XN. By extracting the first feature vector from each of the plurality of sample medical images, the first feature vector can be directly processed using the autoencoder.

In block S103, the computer device inputs the first feature vector into the autoencoder, and extracts a first latent feature of each of the plurality of sample medical images according to the first feature vector.

In one embodiment, the autoencoder can an unsupervised neural network that reproduces input signals as closely as possible. The autoencoder needs to extract the most important features that can represent the input data, for reproducing the input data as closely as possible. Similar to principal component analysis, the autoencoder finds main components that can represent original information.

In one embodiment, in order to obtain a predicted value of the number of cells in each sample medical image, it is necessary to extract main features of each sample medical image through the autoencoder. The main features may be sample cell features in each sample medical image.

In one embodiment, the autoencoder includes an encoding layer and a decoding layer. The encoding layer performs a feature extraction on the first feature vector that is input into the autoencoder, converts a high-dimensional feature vector into a low-dimensional feature vector, and generates a plurality of first cell feature codes. Each of the plurality of first cell feature codes corresponds to a cell in the plurality of sample medical images. The computer device determines the plurality of feature codes as a first latent feature. The decoding layer decodes and reconstructs the first latent feature that is output by the encoding layer, and outputs a reconstructed image.

In one embodiment, the computer device inputs the first feature vector Xi (i=1, 2, . . . , N) into the encoding layer of the autoencoder. The encoding layer performs a feature extraction on a first feature vector Xi, and obtains a first latent feature hi (i=1, 2, . . . , N). The first latent feature includes a plurality of feature codes.

By extracting representative feature information of the plurality of sample medical images through the encoding layer of the autoencoder, not only can cell features in the plurality of sample medical images be extracted, but redundant information can be excluded, thereby reducing a usage of the sample images.

In block S104, the computer device generates a first predicted value of a number of cells in each of the plurality of sample medical images based on the first latent feature.

In one embodiment, the computer device extracts a plurality of first cell feature codes from the first latent features, and determines the first predicted value of the number of cells in each sample medical image according to the first cell feature codes.

In one embodiment, since the encoding layer of an untrained autoencoder has a certain error in a process of extracting features from original data, there will be a certain error between the first predicted value and the marker value. The autoencoder can be optimized by adjusting the frequency or magnitude of certain error.

In block S105, the computer device inputs the first latent features into the autoencoder, reconstructs each sample medical images according to the first latent features, and obtains a plurality of reconstructed images.

In one embodiment, the computer device inputs the first latent feature hi (i=1, 2, . . . , N) obtained by the encoding layer in block S103 into the decoding layer, and the computer device reconstructs the first feature vector by the decoding layer using the first latent feature hi (i=1, 2, . . . , N). The computer device 1 obtains a reconstructed first feature vector Xi*(i=1, 2, . . . , N). The computer device 1 reproduces the reconstructed first feature vector, and obtains each of the plurality of reconstructed images. In correspondence with the first feature vector Xi of the encoding layer, since the encoding layer of the untrained autoencoder has errors in the process of extracting features from the original data, the decoding layer also has errors in a process of reconstructing an original image. Therefore, there is a certain reconstruction error between an output Xi* of the decoding layer and the first feature vector Xi. Subsequently, the autoencoder can be optimized by adjusting the certain reconstruction error.

In block S106, the computer device optimizes the autoencoder based on the plurality of reconstructed images and the first predicted value.

In one embodiment, in order to make extraction of features by the encoding layer more accurate, the computer device makes the decoding layer reproduce main features of the original image as much as possible, and it is necessary to continuously reduce the reconstruction error during a training process. Where the reconstruction error is close to 0, the reconstructed image output by the decoding layer is almost equal to the original image, it can be determined that a feature extracted by the encoding layer is a feature of the original image.

In one embodiment, the computer device reduces the reconstruction error in two aspects. On one hand, the first predicted value output by the encoding layer is as close to the marker value as possible, on the other hand, the reconstructed image output by the decoding layer is as close as possible to each sample medical image.

In one embodiment, the computer device establishes a first loss function according to the plurality of sample medical images and the plurality of reconstructed images, and establishes a second loss function according to the marker value of the number of the cells and the first predicted value. The computer device optimizes the autoencoder based on the first loss function and the second loss function.

Specifically, the computer device calculates an error between each sample medical image and each reconstructed image, and obtains a plurality of first errors. The computer device calculates a first average error based on the plurality of first errors, and sets the first average error as the first loss function. A method for calculating the error between each sample medical image and each reconstructed image is performed according to a cross entropy algorithm and a mean square error algorithm, selected and set according to actual requirements of a user. In one embodiment, the first loss function obtained by adopting the mean square error algorithm is $L1(x)=1/N\Sigma_{i=1}^{N}\|X_i-X_i^*\|_2^2$.

In one embodiment, the computer device calculates a plurality of second errors between the marker value of the number of the cells and the first predicted value corresponding to each sample medical image. The computer device calculates a second average error based on the plurality of second errors, and sets the second average error as the second loss function. The second loss function is $L2(a)=1/N\Sigma_{i=1}^{N}|a_i-a_i^*|$, where $a_i$ represents the marker value of the $i^{th}$ image of the plurality of sample medical images, and $a_i^*$ represents the first predicted value of the $i^{th}$ image of the plurality of sample medical images. In other embodiment, the computer device may also select other methods for calculating the plurality of second errors, such as calculating a mean square error between the marker value of each ample medical image and the first predicted value.

In one embodiment, the computer device constructs a third loss function based on the first loss function and the second loss function, according to formula: $L3(a,X)=m1L1(X)+m2L2(a)$, in which $L1(X)$ represents the first loss function, $L2(a)$ represents the second loss function, $L3(a,X)$ represents the third loss function, m1 represents a weight of the first loss function, and m2 represents a weight of the second loss function. Exemplarily, m1 may be 0.5, and m2 may be 0.5. In a process of training the autoencoder, since the first loss function and the second loss function is changed with a change of the parameters of the autoencoder, the third loss function can be regarded as a parameter of the autoencoder. The computer device continuously adjusts a plurality of parameters of the autoencoder by using a gradient descent method, thereby minimizing the third loss function. The purpose of the gradient descent method is to obtain each extreme point of the third loss function, and calculate a value of each parameter of the autoencoder when the value of the third loss function is the smallest according to the extreme point. Therefore, the computer device obtains an autoencoder structure with the highest accuracy, and the optimized autoencoder is obtained.

In one embodiment, with minimizing the third loss function value, an error between the first predicted value and the marker value, and an error between each sample medical image and each reconstructed image reach a minimum. Thereby, results of the predicted numbers of the cells output by the coding layer are more accurate.

Figure 2:
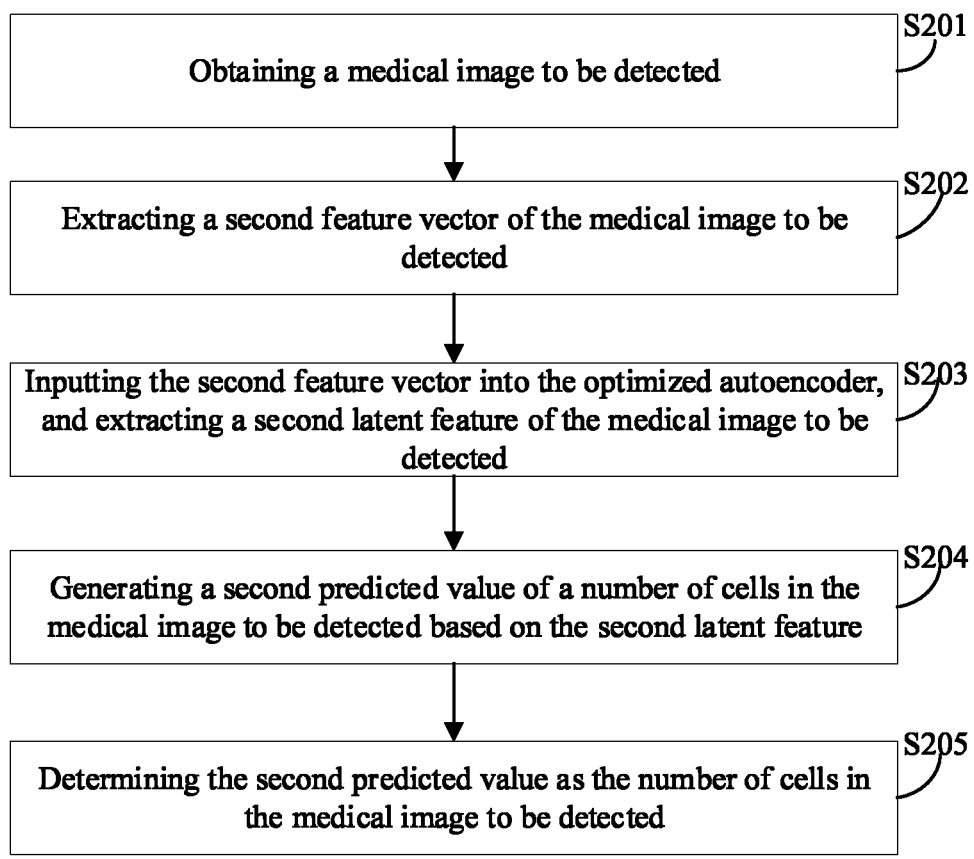
FIG. 2 is a flowchart diagram of a method for detecting a number of cells in images according to an embodiment of the present disclosure.

FIG. 2 is a flowchart diagram of a method for detecting a number of cells in images in an embodiment of the present disclosure.

In block S201, the computer device obtains a medical image to be detected.

In one embodiment, the medical image to be detected may be a high-resolution digital image obtained by scanning with the fully automatic microscope or the optical magnification system. The medical image to be detected may include cells and some impurities.

In block S202, the computer device extracts a second feature vector of the medical image to be detected.

In one embodiment, in order that the optimized autoencoder can detect a number of cells, it is necessary to convert the medical image to be detected into a feature vector.

In one embodiment, the computer device performs the vectorization processing on the medical image to be detected, and a second feature vector of the medical image to be detected is obtained.

In block S203, the computer device inputs the second feature vector into the optimized autoencoder, and extracts a second latent feature of the medical image to be detected.

In one embodiment, the computer device performs feature extraction on the second feature vector, and the second latent feature of the medical image to be detected is obtained. The second latent feature includes a plurality of second cell feature codes. Each of the plurality of second cell feature codes corresponds to a cell in the medical image to be detected.

In block S204, the computer device generates a second predicted value of a number of cells in the medical image to be detected based on the second latent feature.

In one embodiment, the computer device extracts a plurality of second cell feature codes from the second latent feature, and the computer device determines the second predicted value of the number of cells in the medical image to be detected according to the plurality of second cell feature codes.

In block S205, the computer device determines the second predicted value as the number of cells in the medical image to be detected.

In one embodiment, the computer device detects the number of cells by the optimized autoencoder, which is trained by a method for training autoencoders, an error in detecting the number of cells is very small and the error is almost negligible. Therefore, the second predicted value of the number of cells obtained in the block S204 is the number of cells in the medical image to be detected.

Figure 3:
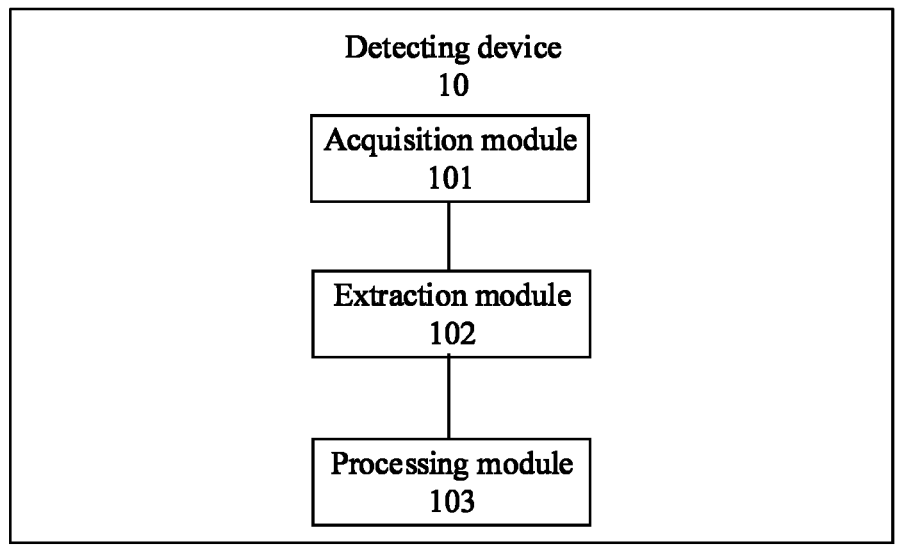
FIG. 3 is a structural diagram of a detecting device in an embodiment of the present disclosure.

FIG. 3 is a structural diagram of a detecting device in an embodiment of the present disclosure.

As shown in FIG. 3, a detecting device 10 includes an acquisition module 101, an extraction module 102, and a processing module 103. The modules in the present disclosure refer to one of a stored series of computer-readable instruction segments that can be executed by at least one processor and that are capable of performing preset functions. In some embodiments, the functions of each module will be described. The acquisition module 101 obtains a plurality of sample medical images. The extraction module 102 extracts a first feature vector from each of the plurality of sample medical images. The extraction module 102 inputs the first feature vector into the autoencoder, and extracts a first latent feature of each of the plurality of sample medical images according to the first feature vector. The processing module 103 generates a first predicted value of a number of cells in each of the plurality of sample medical images based on the first latent feature. The extraction module 102 inputs the first latent feature into the autoencoder, the computer device 1 reconstructs each of the plurality of sample medical images according to the first latent feature, and obtains a plurality of reconstructed images. The processing module 103 optimizes the autoencoder based on the plurality of reconstructed images and the first predicted value.

The acquisition module 101 obtains a medical image to be detected. The extraction module 102 extracts a second feature vector of the medical image to be detected, and the extraction module 102 inputs the second feature vector into the optimized autoencoder, and extracts a second latent feature of the medical image to be detected. The processing module 103 generates a second predicted value of a number of cells in the medical image to be detected based on the second latent feature. The processing module 103 determines the second predicted value as the number of cells in the medical image to be detected.

FIG. 4 is a structural diagram of a computer device housing the detecting device in an embodiment of the present disclosure.

The computer device 1 may include a storage device 11, at least one processor 12. Computer-readable instructions are stored in the storage device 11 and executable by the at least one processor 12.

Those skilled in the art will understand that FIG. 4 is only an example of the computer device 1 and does not constitute a limitation on the computer device 1. Another computer device 1 may include more or fewer components than shown in the figures or may combine some components or have different components. For example, the computer device 1 may further include an input/output device, a network access device, a bus, and the like.

The at least one processor 12 can be a central processing unit (CPU), or can be other general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 12 can be a microprocessor or any conventional processor. The processor 12 is a control center of the computer device 1 and connects various parts of the entire computer device 1 by using various interfaces and lines.

The processor 12 executes the computer-readable instructions to implement the training method of an autoencoder adapted for detecting cells in images in the above embodiments, such as in block S101-S106 shown in FIG. 1, and the processor 12 executes the computer-readable instructions to implement the method for detecting a number of cells in images in the above embodiments, such as in block S201-S205 shown in FIG. 2. Alternatively, the processor 12 executes the computer-readable instructions to implement the functions of the modules/units in the foregoing device embodiments, such as the modules 101-103 in FIG. 3.

For example, the computer-readable instructions can be divided into one or more modules/units, and the one or more modules/units are stored in the storage device 11 and executed by the at least one processor 12. The one or more modules/units can be a series of computer-readable instruction segments capable of performing specific functions, and the instruction segments are used to describe execution processes of the computer-readable instructions in the computer device 1. For example, the computer-readable instruction can be divided into the acquisition module 101, the extraction module 102 and the processing module 103 as shown in FIG. 3.

The storage device 11 stores the computer-readable instructions and/or modules/units. The processor 12 may run or execute the computer-readable instructions and/or modules/units stored in the storage device 11 and may call up data stored in the storage device 11 to implement various functions of the computer device 1. The storage device 11 mainly includes a storage program area and a storage data area. The storage program area may store an operating system, and a program required for at least one function (such as a sound playback function, an image playback function, for example), for example. The storage data area may store data (such as audio data, phone book data, for example) created during the use of the computer device 1. In addition, the storage device 11 may include a high-speed randomly access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 11 may be an external memory and/or an internal memory of the computer device 1. The storage device 11 may be a memory in a physical form, such as a memory stick, or a Trans-flash Card (TF card), for example.

When the modules/units integrated into the computer device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 11 in the computer device 1 stores a plurality of instructions to implement a training method of an autoencoder adapted for detecting cells in images, and the processor 12 can execute the multiple instructions to: obtain a plurality of sample medical images, extract a first feature vector from each of the plurality of sample medical images, input the first feature vector into an autoencoder, and extract a first latent feature of each of the plurality of sample medical images according to the first feature vector, generate a first predicted value of a number of cells in each of the plurality of sample medical images based on the first latent feature, input the first latent feature into the autoencoder, reconstruct each of the plurality of sample medical images according to the first latent feature, and obtain a plurality of reconstructed images, and optimize the autoencoder based on the plurality of reconstructed images and the first predicted value.

With reference to FIG. 2, the storage device 11 in the computer device 1 stores a plurality of instructions to implement a method for detecting a number of cells in images, and the processor 12 can execute the multiple instructions to: obtain a medical image to be detected, extract a second feature vector of the medical image to be detected, input the second feature vector into the optimized autoencoder, and extract a second latent feature of the medical image to be detected, generate a second predicted value of a number of cells in the medical image to be detected based on the second latent feature, and determine the second predicted value as the number of cells in the medical image to be detected.

The computer-readable instructions are executed by the processor 12 to realize the functions of each module/unit in the above-mentioned device embodiments, which will not be repeated here.

In the several embodiments provided in the preset disclosure, the disclosed computer device and method can be implemented in other ways. For example, the embodiments of the devices described above are merely illustrative. For example, a division of the modules is based on logical function only, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, not any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A training method of an autoencoder adapted for detecting cells in images, the training method comprising:
obtaining a plurality of sample medical images, each of the plurality of sample medical images comprising a cell number marker value;
extracting a first feature vector from each of the plurality of sample medical images;
inputting the first feature vector into an autoencoder, and extracting a first latent feature of each of the plurality of sample medical images according to the first feature vector, comprising: converting the first feature vector into a feature vector having a lower dimension than a dimension of the first feature vector, generating a plurality of first cell feature codes by using the autoencoder, and determining the plurality of first cell feature codes as the first latent feature, each of the plurality of first cell feature codes corresponds to a cell in the plurality of sample medical images;

generating a first predicted value of a number of cells in each of the plurality of sample medical images based on the first latent feature;

inputting the first latent feature into the autoencoder, reconstructing each of the plurality of sample medical images according to the first latent feature, and obtaining a plurality of reconstructed images; and optimizing the autoencoder based on the plurality of reconstructed images and the first predicted value, and comprising: establishing a first loss function according to the plurality of sample medical images and the plurality of reconstructed images; establishing a second loss function according to the cell number marker value and the first predicted value; and optimizing the autoencoder based on the first loss function and the second loss function.

2. The training method of an autoencoder adapted for detecting cells in images of claim 1, wherein generating the first predicted value of the number of cells in each of the plurality of sample medical images based on the first latent feature comprises:

extracting a plurality of first cell feature codes from the first latent features; and determining the first predicted value of the number of cells in each of the plurality of sample medical images according to the plurality of first cell feature codes.

3. The training method of an autoencoder adapted for detecting cells in images of claim 1, wherein establishing a first loss function according to the plurality of sample medical images and the plurality of reconstructed images comprises:

calculating an error between each of the plurality of sample medical images and each of the plurality of reconstructed images, and obtaining a plurality of first errors; and calculating a first average error based on the plurality of first errors, and setting the first average error as the first loss function.

4. The training method of an autoencoder adapted for detecting cells in images of claim 1, wherein establishing a second loss function according to the cell number marker value and the first predicted value comprises:

calculating a plurality of second errors between the cell number marker value and the first predicted value corresponding to each of the plurality of sample medical images; and calculating a second average error based on the plurality of second errors, and setting the second average error as the second loss function.

5. The training method of an autoencoder adapted for detecting cells in images of claim 1, wherein optimizing the autoencoder based on the first loss function and the second loss function comprise:

constructing a third loss function based on the first loss function and the second loss function, according to a calculation formula of:

$L3(a,X)=m1L1(X)+m2L2(a)$, wherein $L1(X)$ represents the first loss function, $L2(a)$ represents the second loss function, $L3(a,X)$ represents the third loss function, $m1$ represents a weight of the first loss function, and $m2$ represents a weight of the second loss function;

adjusting a plurality of parameters of the autoencoder, and calculating a function value of the third loss function according to an adjusted autoencoder; and determining the adjusted autoencoder as an optimized autoencoder until the function value is reduced to be a minimum by repeating adjusting the plurality of parameters of the autoencoder.

6. The training method of an autoencoder adapted for detecting cells in images of claim 1, the method for detecting a number of cells in images comprising:

obtaining a medical image to be detected;

extracting a second feature vector of the medical image to be detected;

inputting the second feature vector into the optimized autoencoder, and extracting a second latent feature of the medical image to be detected;

generating a second predicted value of a number of cells in the medical image to be detected based on the second latent feature; and determining the second predicted value as the number of cells in the medical image to be detected.

7. A computer device comprising:

a processor; and a storage device storing a plurality of instructions, which when executed by the processor, cause the processor to:

obtain a plurality of sample medical images, each of the plurality of sample medical images comprising a cell number marker value;

extract a first feature vector from each of the plurality of sample medical images;

input the first feature vector into an autoencoder, and extract a first latent feature of each of the plurality of sample medical images according to the first feature vector, by: converting the first feature vector into a feature vector having a lower dimension than a dimension of the first feature vector, generating a plurality of first cell feature codes by using the autoencoder, and determining the plurality of first cell feature codes as the first latent feature, each of the plurality of first cell feature codes corresponding to a cell in the plurality of sample medical images;

generate a first predicted value of a number of cells in each of the plurality of sample medical images based on the first latent feature;

input the first latent feature into the autoencoder, reconstruct each of the plurality of sample medical images according to the first latent feature, and obtain a plurality of reconstructed images; and optimize the autoencoder based on the plurality of reconstructed images and the first predicted value, and comprising: establish a first loss function according to the plurality of sample medical images and the plurality of reconstructed images; establish a second loss function according to the cell number marker value and the first predicted value; and optimize the autoencoder based on the first loss function and the second loss function.

8. The computer device of claim 7, wherein the processor is further caused to:

calculate an error between each of the plurality of sample medical images and each of the plurality of reconstructed images, and obtain a plurality of first errors; and calculate a first average error based on the plurality of first errors, and set the first average error as the first loss function.

9. The computer device of claim 7, wherein the processor is further caused to:
calculate a plurality of second errors between the cell number marker value and the first predicted value corresponding to each of the plurality of sample medical images; and
calculate a second average error based on the plurality of second errors, and set the second average error as the second loss function.

10. The computer device of claim 7, wherein the processor is further caused to:
obtain a medical image to be detected;
extract a second feature vector of the medical image to be detected;
input the second feature vector into the optimized autoencoder, and extract a second latent feature of the medical image to be detected;
generate a second predicted value of a number of cells in the medical image to be detected based on the second latent feature; and
determine the second predicted value as the number of cells in the medical image to be detected.

11. A non-transitory storage medium having stored thereon at least one computer-readable instructions, which when executed by a processor of a computer device, causes the processor to perform a training method of an autoencoder adapted for detecting cells in images, the training method comprising:
obtaining a plurality of sample medical images, each of the plurality of sample medical images comprising a cell number marker value;
extracting a first feature vector from each of the plurality of sample medical images;
inputting the first feature vector into an autoencoder, and extracting a first latent feature of each of the plurality of sample medical images according to the first feature vector, comprising: converting the first feature vector into a feature vector having a lower dimension than a dimension of the first feature vector, generating a plurality of first cell feature codes by using the autoencoder, and determining the plurality of first cell feature codes as the first latent feature, each of the plurality of first cell feature codes corresponds to a cell in the plurality of sample medical images;
generating a first predicted value of a number of cells in each of the plurality of sample medical images based on the first latent feature;

inputting the first latent feature into the autoencoder, reconstructing each of the plurality of sample medical images according to the first latent feature, and obtaining a plurality of reconstructed images; and
optimizing the autoencoder based on the plurality of reconstructed images and the first predicted value, and comprising: establishing a first loss function according to the plurality of sample medical images and the plurality of reconstructed images; establishing a second loss function according to the cell number marker value and the first predicted value; and optimizing the autoencoder based on the first loss function and the second loss function.

12. The non-transitory storage medium of claim 11, wherein establishing a first loss function according to the plurality of sample medical images and the plurality of reconstructed images comprises:
calculating an error between each of the plurality of sample medical images and each of the plurality of reconstructed images, and obtaining a plurality of first errors; and
calculating a first average error based on the plurality of first errors, and setting the first average error as the first loss function.

13. The non-transitory storage medium of claim 11, wherein a density function expression of the T distribution is:
calculating a plurality of second errors between the cell number marker value and the first predicted value corresponding to each of the plurality of sample medical images; and
calculating a second average error based on the plurality of second errors, and setting the second average error as the second loss function.

14. The non-transitory storage medium of claim 11, the method for detecting a number of cells in images comprising:
obtaining a medical image to be detected;
extracting a second feature vector of the medical image to be detected;
inputting the second feature vector into the optimized autoencoder, and extracting a second latent feature of the medical image to be detected;
generate a second predicted value of a number of cells in the medical image to be detected based on the second latent feature; and
determining the second predicted value as the number of cells in the medical image to be detected.

* * * * *